US012783462B2

(12) United States Patent
Arvind et al.

(10) Patent No.: US 12,783,462 B2
(45) Date of Patent: Nov. 3, 2026

(54) MANAGING DATA DELETION AMONG MULTIPLE DATA STORES

(71) Applicant: Netflix, Inc., Los Gatos, CA (US)

(72) Inventors: Vidhya Arvind, San Ramon, CA (US); David Imran Noor, Kirkland, WA (US); Vinay Kumar Chella, Santa Clara, CA (US); Van Quie Luy, Irvine, CA (US); Patrick Scott Thomas, Redwood City, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 18/916,642

(22) Filed: Oct. 15, 2024

(65) Prior Publication Data

US 2026/0105025 A1 Apr. 16, 2026

(51) Int. Cl.
*G06F 16/00* (2019.01)
*G06F 16/11* (2019.01)
*G06F 21/62* (2013.01)

(52) U.S. Cl.
CPC ........ *G06F 16/128* (2019.01); *G06F 21/6254* (2013.01)

(58) Field of Classification Search
None
See application file for complete search history.

(56) References Cited

U.S. PATENT DOCUMENTS 9,317,715 B2 * 4/2016 Schuette ............. G06F 21/6254
9,910,902 B1 * 3/2018 Kramer ............... G06F 16/2272
11,645,418 B2 * 5/2023 Brannon ................. G06F 16/23 726/1
12,032,720 B2 * 7/2024 Netke ................. G06F 21/6245
2014/0059355 A1 * 2/2014 Schuette ............. G06F 21/6218 713/189
2018/0082082 A1 * 3/2018 Lowenberg ........... G06F 21/602
2019/0180053 A1 * 6/2019 Angara ............... G06F 21/6254
2020/0167238 A1 5/2020 Killamsetti et al.
(Continued)

FOREIGN PATENT DOCUMENTS

CN 118193296 A 6/2024

OTHER PUBLICATIONS

International Search Report and Written Opinion issued in PCT Application No. PCT/US2025/050125 dated Jan. 16, 2026.

*Primary Examiner* — Farhan M Syed
(74) *Attorney, Agent, or Firm* — Hogan Lovells Cadwalader US LLP

(57) ABSTRACT

A computer-implemented method includes accessing metadata that indicates how data sets that include a specified type of data are mapped among multiple data stores within a data management platform. The method includes auditing the data sets, based on the mapping, to determine where, among the data stores, instances of the specified type of data are stored. The method further takes an offline snapshot of the data stores that include the specified type of data to capture a current state of the instances of the specified type of data that were identified during the auditing and searches the offline snapshot for instances of the specified type of data that are marked for deletion. The method also deletes the marked instances of the specified type of data according to a data deletion policy that governs how the instances are to be deleted. Various other methods, systems, and computer-readable media are also disclosed.

18 Claims, 7 Drawing Sheets

(56) References Cited

U.S. PATENT DOCUMENTS

| | | | | |
|---|---|---|---|---|
| 2020/0387633 | A1* | 12/2020 | Kapinos | G06F 21/6245 |
| 2021/0026987 | A1* | 1/2021 | Woessner | G06F 21/6263 |
| 2021/0165912 | A1* | 6/2021 | Huang | G06F 21/6254 |
| 2021/0209250 | A1* | 7/2021 | Prgin | G06F 21/6254 |
| 2022/0164474 | A1* | 5/2022 | Netke | G06F 21/6254 |

* cited by examiner

MANAGING DATA DELETION AMONG MULTIPLE DATA STORES

BACKGROUND

Software application platforms, media streaming services, website providers, and other entities routinely gather users'data. For instance, when users sign up for online services, for example, they typically provide their name, email address, home address, and possibly payment information. These types of information are generally referred to as personally identifiable information (PII). Software application platforms, websites, media streaming services, and other receivers of this PII typically take security measures to ensure the user's personally identifiable information stays safe. When PII is provided to these entities, some or all of it may be stored across many different storage locations. If the user ever decides to quit the service or remove their name from a website or platform, that data may be difficult to fully locate and remove from the disparate storage systems.

SUMMARY

As will be described in greater detail below, the present disclosure generally describes systems and methods for managing data deletion for data that is stored across multiple different storage systems.

In one example, for instance, a computer-implemented method includes accessing metadata that indicates how various data sets that include a specified type of data are mapped among multiple data stores within a data management platform. The method next includes auditing at least one of the data sets, based on the mapping, to determine where, in the various data stores, instances of the specified type of data are stored. The method then includes taking an offline snapshot of at least a portion of the data stores that includes the specified type of data to capture a current state of the instances of the specified type of data that were identified during the auditing. The method further includes searching the offline snapshot for instances of the specified type of data that are marked for deletion, and then deleting the marked instances of the specified type of data according to a data deletion policy that governs how the instances of the specified type of data are to be deleted.

In some cases, the specified type of data includes personally identifiable information (PII). In some embodiments, the PII is identified and deleted after receiving a request from a user to delete their PII. In some examples, at least one of the instances of the specified type of data includes data that has been anonymized.

In some embodiments, the data stores within the data management platform include at least two data stores that store the data sets using two different storage schemas. In some examples, the offline snapshot includes instances of the specified type of data that include data corresponding to a specified user. In some embodiments, searching the offline snapshot for instances of the specified type of data that are marked for deletion includes searching for instances of the specified type of data that are older than a specified date.

In some cases, the marked instances of the specified type of data are deleted in a dynamically varied manner that increases or reduces deletions based on one or more factors. In some embodiments, the factors include CPU utilization and/or hard drive read/write utilization. In some cases, the increases or reductions in deletions occur automatically based on changes in the various factors. In some examples, the increases or decreases in deletions occur upon receiving inputs from a user specifying how the deletions are to change. In some embodiments, the increases or reductions in deletions occur automatically to avoid degrading the provisioning of live data below a specified threshold level of performance.

In some cases, a data deletion policy indicates that deletions are to slow or stop until processing or data storing resources are below a specified maximum threshold level. In some examples, the data deletion policy specifies different levels of priority for the data deletions. In some embodiments, the marked instances of the specified type of data are deleted according to the specified levels of priority. In some cases, the mapping specifies dependencies between instances of the specified type of data, and the instances of the specified type of data are deleted based on the identified dependencies. In some embodiments, different data stores have different rates at which the instances of the specified type of data are to be deleted. In some examples, different data stores specify different times to live for instances of the specified type of data.

A corresponding system includes at least one physical processor and physical memory including computer-executable instructions that, when executed by the physical processor, cause the physical processor to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

In some examples, a corresponding non-transitory computer-readable medium is provided that includes one or more computer-executable instructions that, when executed by at least one processor of a computing device, cause the computing device to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the present disclosure.

Figure 1:
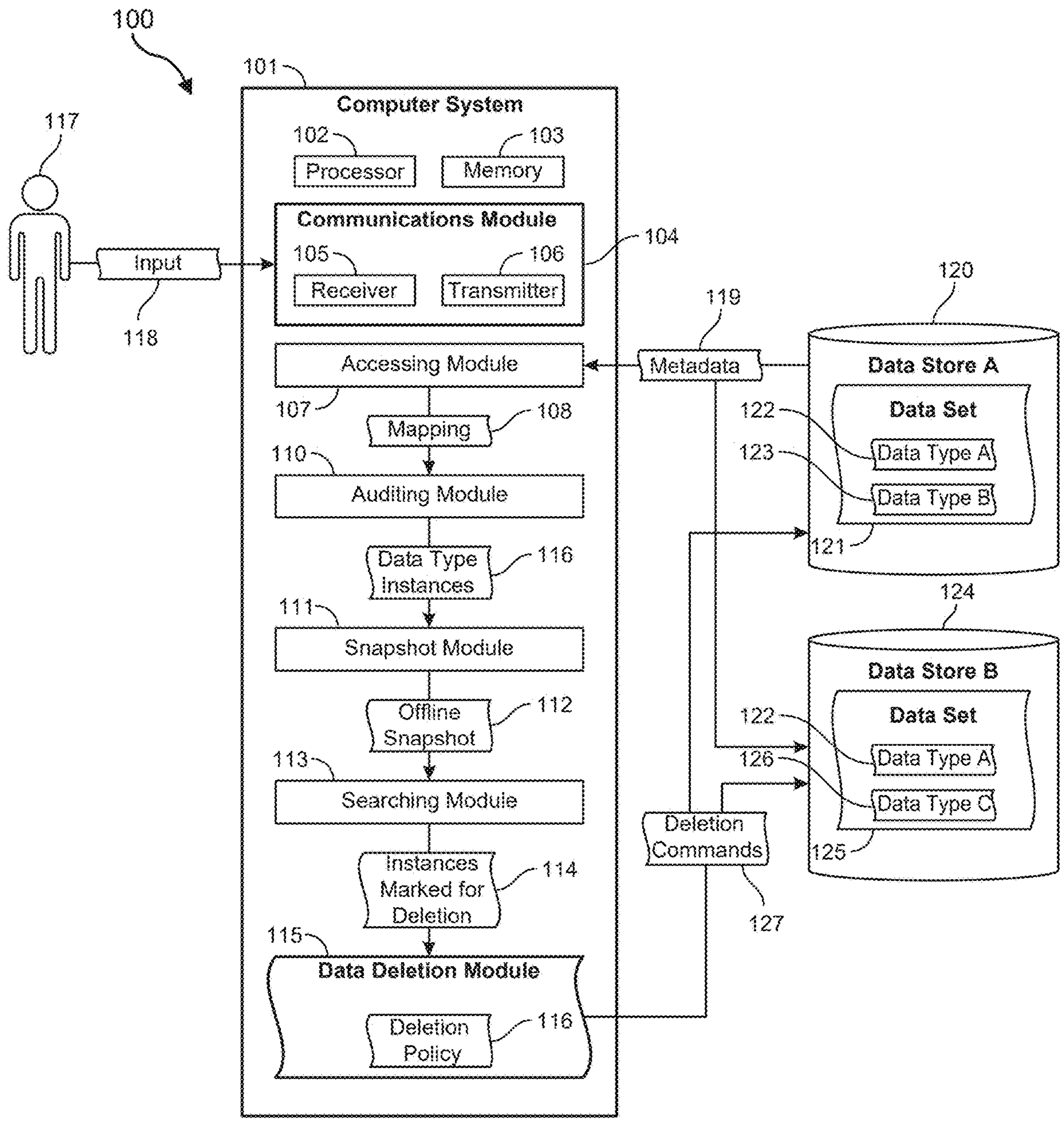
FIG. 1 illustrates an example computer architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to managing data deletion for data that is stored across multiple different storage systems.

Modern software platforms provide many different services to users. These services may include anything from financial tools to video games to media streaming services. The software services are typically provided through applications (e.g., smartphone "apps") or through websites. In order to customize offerings for each user and, at least in some cases, in order to facilitate payment for services, these applications and websites often request and store personally identifiable information (PII) associated with each user.

The PII may include a user's name, email address, home address, payment information, viewing history, or other information that is tied to the user. Software platforms, media streaming services, and other entities that receive this information are often required by law to ensure that the user's PII information stays private and secure. Entities that store this information will typically employ anti-malware and data security software and hardware (e.g., firewalls) to ensure that the users'data stays secure.

Many of these entities maintain large and disparate systems to store different types of PII information. For instance, some PII may be more valuable than other types and may have a higher level of security. Some PII, for example, such as credit card numbers, Social Security numbers, tax information, health information, or other sensitive information is typically encrypted and may only be accessed with two-factor authentication. Other information may be less secure and may be stored on servers with lower levels of security. Accordingly, when a user wishes to quit a service and, consequently, have their PII removed from the system, the process may be much more complex than simply deleting a few fields of information. The PII data may be stored in multiple different databases with different levels of security and may be stored using different schemas or different formats.

As such, the systems described herein are designed to find the user's PII, wherever it is stored across a software platform. These systems then determine how the data is to be removed based on its location, schema, formatting, etc. Once the location and removal methods have been determined, the systems herein delete the data at optimal times and in ways that adapt to the system's workflow to ensure that the deletions are not overly burdensome on the online systems, which provision data to requesting users. These processes will be described in greater detail below with reference to FIGS. 1-9.

FIG. 1, for example, illustrates a computing environment 100 in which data deletion is prudently managed for data that is stored across multiple different storage systems. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes an accessing module 107 that is configured to access metadata 119. The metadata 119 includes data indicating how specific types of data (e.g., PII) are mapped among multiple different data stores within a data management platform. For instance, the metadata 119 may indicate how data type A 122 (e.g., a user's payment data) is mapped within data set 121 in data store A 120. The metadata 119 may also indicate how data type B 123 (e.g., a user's contact information, including name, email address, phone number, etc.) is mapped within data set 121 in data store A 120. The data of type A 122 may also be stored in data set 125 in data store B 124. Other data of data type C 126 is also stored in data set 125 of data store B 124. Each of these data types may be stored using different formats, different schemas, different types of encryption, etc. These various data storage rubrics may be identified in the metadata 119. The metadata 119 may be stored in data store A 120, data store B 124, in computer system 101, and/or in other data stores.

The mapping 108 of data types to different data sets and/or different storage locations is provided to the auditing module 109 of computer system 101. The auditing module 109 audits the various data sets to determine where instances of each type of data are stored. The instances of each data type 110 may be stored in a single data set or in multiple different data sets and/or in multiple different data stores. In cases where the specified type of data is personally identifiable information or a specific type of PII (e.g., payment information), the auditing module 109 will use the mapping information 108 to determine what the data is, where the data is stored, and which schemas or formatting or encryption are involved. This information is then provided to the snapshot module 111.

The snapshot module 111 of computer system 101 is configured to take an offline snapshot of the data stores that include the PII data (or other type of data). The offline snapshot 112 is designed to capture the current state of the instances of the specified type of data 116 that were identified during the auditing. In some cases, the offline snapshot 112 captures an entire data set (e.g., 121 or 125). In other cases, the offline snapshot 112 captures only the data of the specified type that is to be deleted (e.g., PII). The offline snapshot 112 identifies where each data item is listed (e.g., in a discrete file, or in a row and/or column of a database, in a data blob, or other data structure) and how the data item was stored. The searching module 113 then searches the offline snapshot for instances of the specified type of data 110 that are marked for deletion 114. Instances that are marked for deletion 114 are those that are to be deleted based on a user request for removal, based on service being terminated for the user, or based on time-to-live (TTL) that has expired due to lack of use. The data deletion module 115 then deletes the instances marked for deletion 114 according to a deletion policy 116. These concepts will be described in greater detail with respect to method 200 of FIG. 2 and FIGS. 1-9 below.

Figure 2:
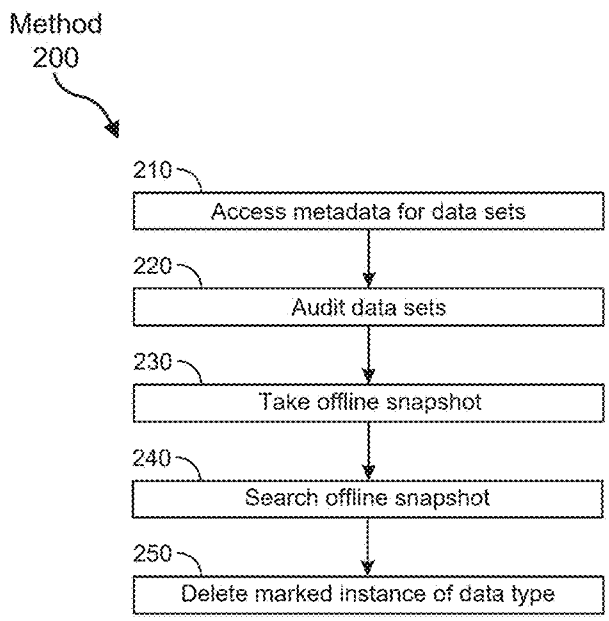
FIG. 2 illustrates a flow diagram of an exemplary method for managing data deletion for data that is stored across multiple different storage systems.

FIG. 2 is a flow diagram of an exemplary computer-implemented method 200 for managing data deletion for data that is stored across multiple different storage systems. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, a step for accessing metadata that indicates how various data sets that include a specified type of data are mapped among multiple different data stores within a data management platform. Next, method 200 includes, at 220, a step for auditing at least one of the data sets, based on the mapping, to determine where, in the various data stores, instances of the specified type of data are stored. Then, at 230, the method 200 includes a step of taking an offline snapshot of at least a portion of the data stores that include the specified type of data to capture a current state of the instances of the specified type of data that were identified during the auditing. At 240, the method 200 includes a step for searching the offline snapshot for instances of the specified type of data that are marked for deletion and, at 250, a step for deleting the marked instances of the specified type of data according to a data deletion policy that governs how the instances of the specified type of data are to be deleted.

Figure 3:
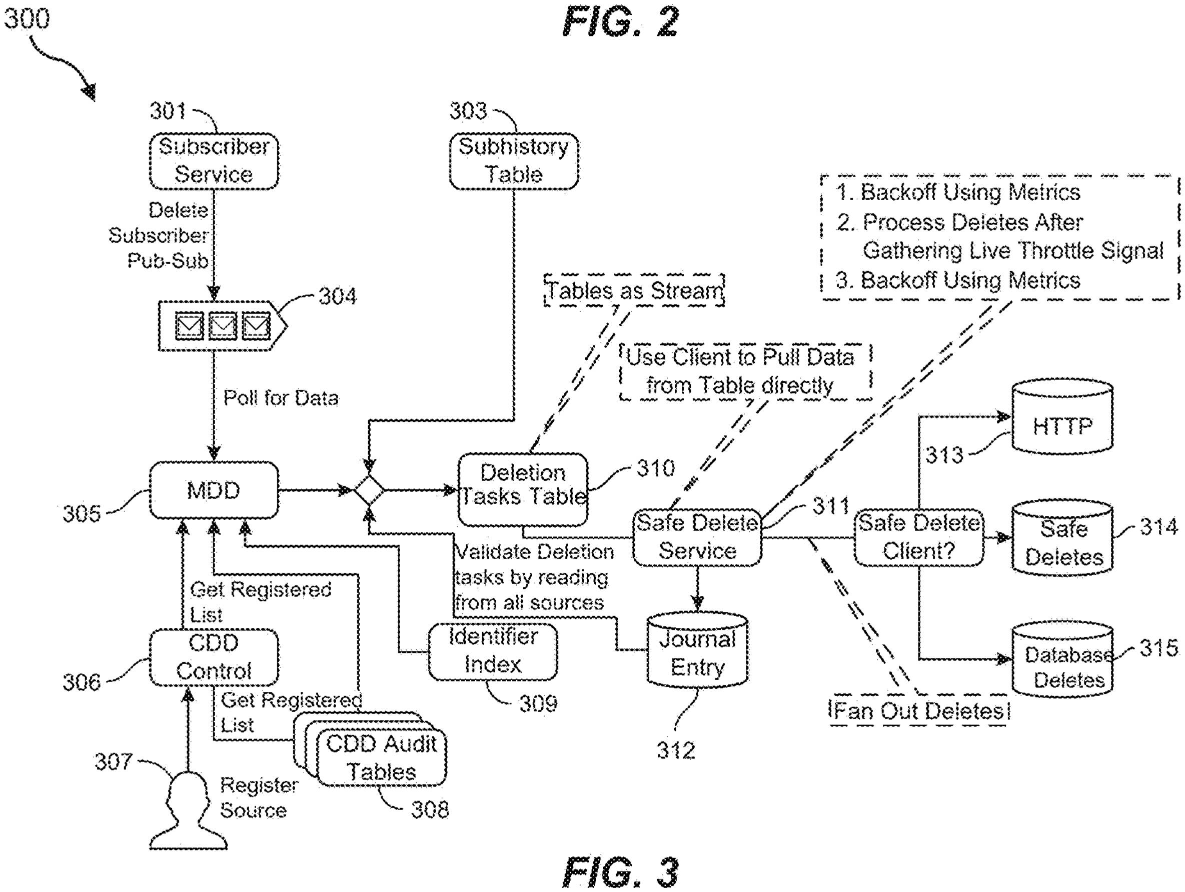
FIG. 3 illustrates an alternative embodiment of a computing environment in which the embodiments described herein may operate.

FIG. 3 illustrates an embodiment of a computing architecture 300 in which data deletion is managed across multiple different data storage systems. The computing architecture includes various software and/or hardware modules for performing different functions. For example, at least in some embodiments, the subscriber service 301 manages subscriptions to a service or feature. In some cases, for example, the service may be media provisioning or media streaming. A user may sign up for such a media streaming service, providing PII, including name, mailing address, email address, phone number, credit card information, streaming preferences, and/or other data. The user may use a phone, tablet, computer, television, or other electronic device to sign up for the service. The user's subscription history is stored in the subscription history or "subhistory" table 303.

Some time after subscribing to the media streaming service (or other service, application, website, or feature), the user decides to unsubscribe from the service 304. As part of this process, the managed data deletion module 305 determines how to locate and delete all of the user's data. In some cases, if the user is a recent subscriber, some database tables may not be fully updated and, as such, requests for deletion may fail. However, when tried again at a later point in time, the database tables will have been fully updated, and the data will be identified for deletion.

The consumer data deletion module 306 will communicate with the register source 307 and one or more consumer data deletion (CDD) audit tables 308 to determine where the data for deletion is located within all of the systems managed by the service-providing entity. As noted above, the systems described herein access metadata (e.g., including identifier index 309) that indicates how data sets that include the data for deletion are mapped among the various stores of the data management platform. The system then performs an audit among the data sets to determine where the data that is to be deleted is located. The audit may also determine which data storage schemas were used for each identified data set, which storage formats were used, which encryption type(s) were used on the data, or other information that is relevant to how the data will be deleted. If the data is stored in a single, self-contained file, that file will be deleted or marked for deletion. If the data is stored in a database table, a specific row or column or series of rows and columns will be tagged for deletion. Other schemas may call for deletion of other data structures, including pointers to PII or other data.

The deletion tasks table 310 then takes this knowledge and provides the data as a stream to the safe delete service 311. The safe delete service 311 ensures that the identified data is deleted in a manner that does not impinge on data that is actively being served to clients. For instance, if a server and/or database are actively provisioning data to clients, this process will take a certain amount of processing resources (e.g., central processing unit (CPU) cycles, memory (e.g., random access memory), data storage, etc.) as well as networking resources (e.g., network interface card, firewall, gateway, or other networking resources). If provisioning live data to clients is taking large amounts of processing and/or networking resources, the safe deletion tasks may be postponed to a later time when demand for live data is lower. In some cases, the processing of safe delete tasks increases or decreases automatically as processing and network resources rise and fall.

In some cases, the data for deletion (e.g., PII in general, or more specifically, a certain user's PII) is spread over various data stores or entities (e.g., 313, 314, 315). Data that is deleted may be noted as an entry in the journal 312. The process of safely deleting data may be performed over a specified time interval that may be stretched out to accommodate the live processing of data. In some cases, the PII is identified and deleted upon receiving a request from a user to delete their PII. In some embodiments, that PII data may have been anonymized prior to storage. In such cases, even anonymized PII data may be safely deleted from the platform's various data stores. In other cases, data that has been sufficiently anonymized so that there is no way to trace the data back to an individual user may be retained.

Figure 4:
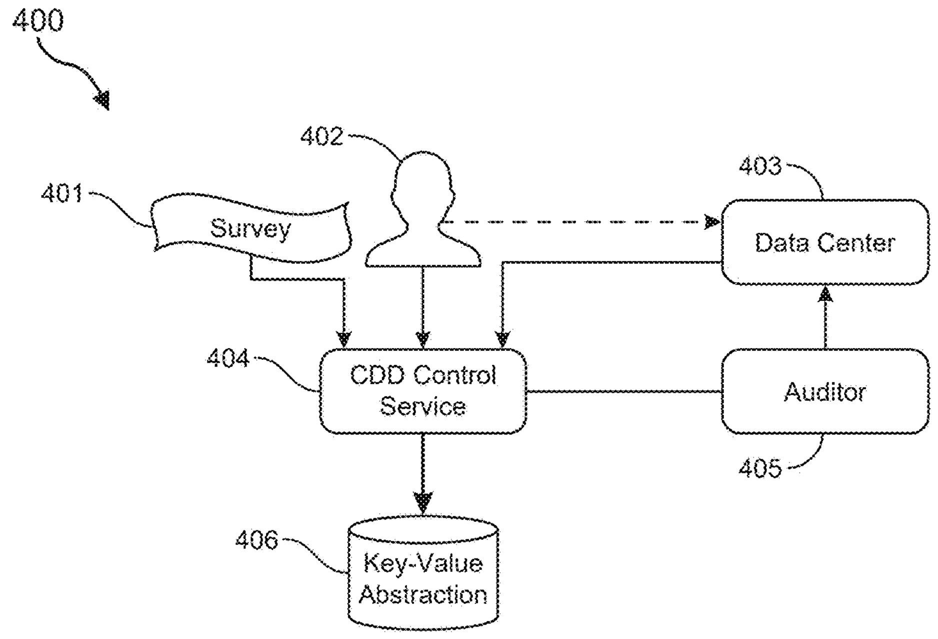
FIG. 4 illustrates an embodiment in which data stores may be audited to identify instances of a specified type of data.

FIG. 4 illustrates an embodiment in which a consumer data deletion (CDD) control service 404 works within a platform 400 to delete a user's PII data (e.g., user 402). The CDD control service 404 interacts with a data center 403 to identify the PII and ultimately perform the data deletions. The data center 403 may include multiple different local or remote (e.g., cloud-based) data stores. At least in some cases, some of the data stores use different data storage schemas. As such, PII is stored and/or accessed in different manners according to the differing schemas. In some cases, for instance, data that is marked for deletion may be identified using key values for a database table (e.g., key-value abstractions 406).

Thus, when performing an audit, the auditor module 405 accesses the data according to the storage schema that was used in each specific data store. Within this platform, the CDD control service 404 may implement a survey 401 to determine to record all of the entities that have consumer data retention identifiers. The system then stores identifier type and mapping of columns to identifiers for each data store having PII. In some cases, the system performs a custom query if there is no direct relationship between identifier type and the mapping. These custom queries are also stored in the control plane, potentially along with other information including ownership details showing the owner of each portion of PII.

Figure 5:
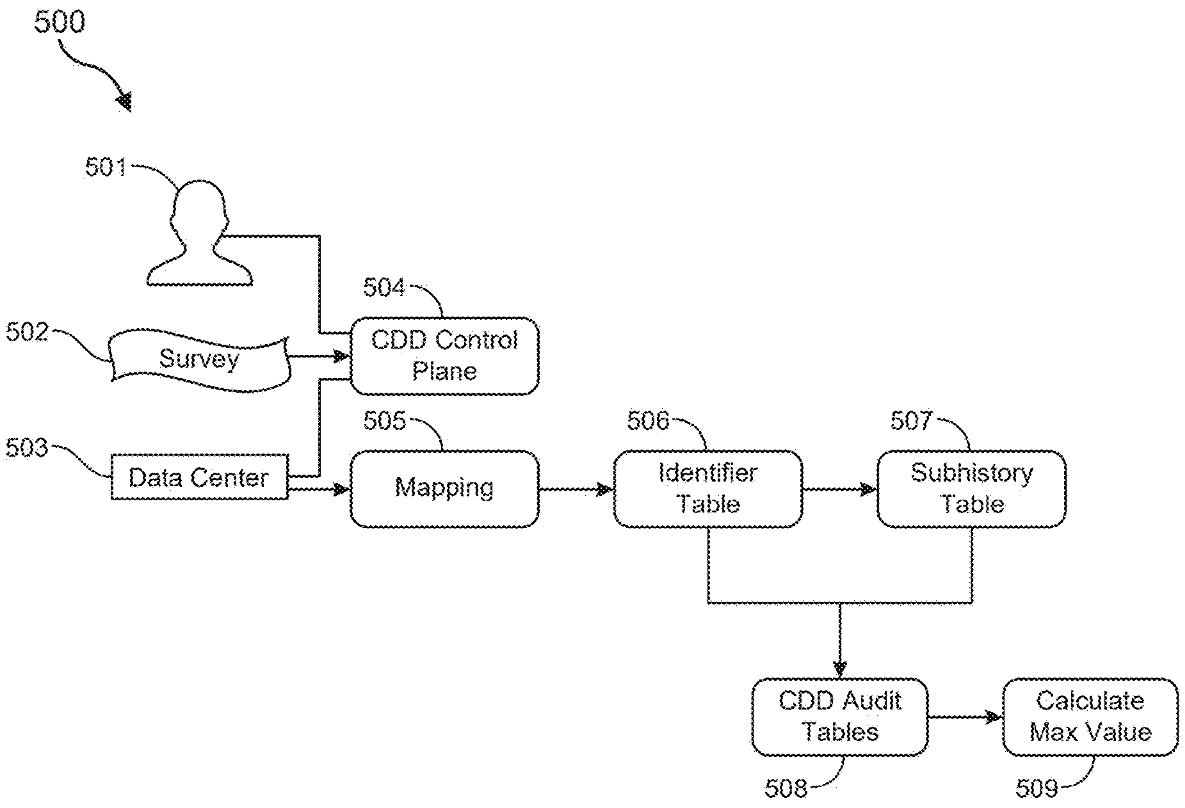
FIG. 5 illustrates an alternative embodiment in which data stores may be audited to identify instances of a specified type of data.

FIG. 5 illustrates an embodiment of a data deletion platform 500 in which a CDD control plane 504 is implemented to identify and delete a user's PII or other specified data (e.g., data associated with user 501). The CDD control plane 504 accesses data from a data center 503 and conducts a survey 502 to create a mapping of where, among multiple data stores of the data center 503, the PII is located. The resulting mapping 505 of data to certain locations is reflected in an identifier table 506 and subhistory table 507. In some cases, an offline snapshot is taken of some portions of a data set (e.g., those portions that include PII) or all of a data set. In some embodiments, the offline snapshot will include instances of the specified type of data (e.g., PII) that correspond to a specified user. Thus, not only will the data identified in the snapshot that is marked for deletion be PII, the data will be PII related to a specific user (e.g., a user that has requested removal from a service). The data in the offline snapshot may be recent data or may be data that is older than a specified date (e.g., older than (and including) the date the user signed up for the service).

Still further, the data deletion platform 500 of FIG. 5 may also perform an audit to determine who owns the user's data and how the PII data is to be deleted. The CDD audit tables 508 are implemented to determine how the data is to be safely deleted. In some cases, a maximum deletion rate 509 is calculated, above which deletions will be reduced or halted entirely for a period of time. The safe deletion of data is described in greater detail with reference to FIG. 6.

Figure 6:
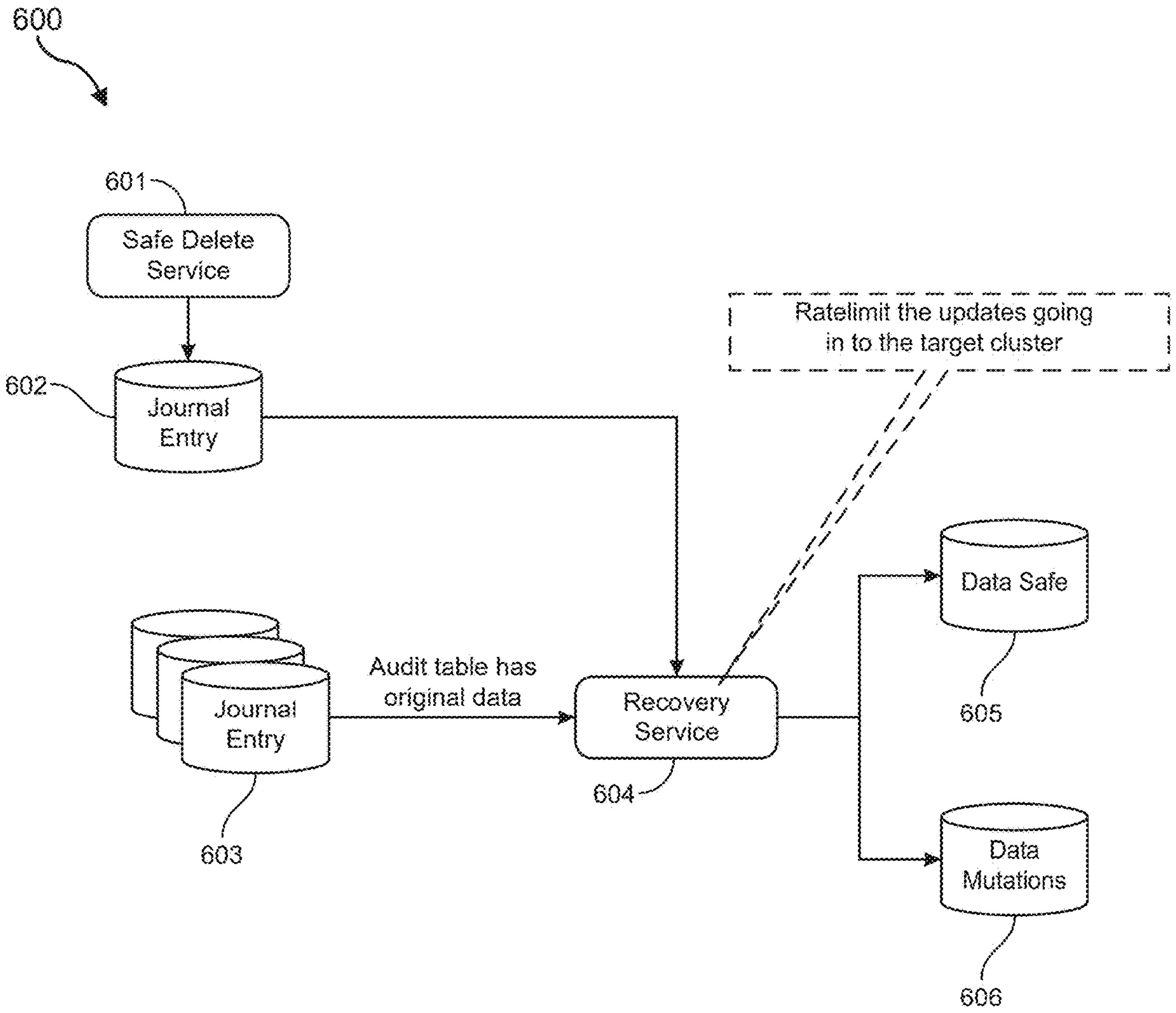
FIG. 6 illustrates an embodiment where, if data is deleted by accident, the systems herein will recover the data within a specified timeframe.

FIG. 6 illustrates an embodiment of a safe deletion system 600 that includes a safe delete service 601 and a recovery service 604. The safe delete service 601 and the recovery service 604 may track deletions and/or data that is marked for deletion in journal entries 602 and 603, respectively. In some cases, when an item has been marked for deletion (e.g., a file, a data row or column, a data blob, an entire data set, etc.), the deletion may be carried out in a controlled manner that accounts for current processing operations. Indeed, in cases where the underlying platform is a media streaming service, the various data stores are constantly being accessed to sign up new users, to log users in, to serve live user interfaces, to provision movies and television shows, and to perform other tasks. These tasks cause an increase in processing load and/or networking load.

The safe deletion system 600 is configured to take these increases (or decreases) in processing and/or networking load into consideration when performing the deletions. In some cases, the marked instances of the specified type of data (e.g., PII) are deleted in a dynamically varied manner that increases or reduces deletions based on various factors. Thus, if these factors rise or fall over time, the deletion process will increase or reduce deletions dynamically in conjunction with these rises and falls. In some cases, these factors include CPU utilization and/or hard drive read/write utilization. Thus, in such cases, as CPU utilization and/or hard drive read/write utilization rises, data deletions will be reduced or will be stopped entirely. As CPU utilization and/or hard drive read/write utilization falls, data deletions will be slowly increased or will be allowed to occur as fast as the hard drives or solid-state drives can perform the erasures.

In some embodiments, these increases or reductions in deletions will occur automatically based on changes in the various factors. These increases or reductions in deletions may occur automatically to avoid degrading the provisioning of live data below a specified threshold level of performance. Thus, the safe deletion system 600, at least in some cases, will determine a minimum level of servicing for the live data that is to be maintained. And, if the system comes close to degrading the provisioning of live data below a specified threshold level of performance, the system will stop or reduce the rate at which data deletions are performed. Thus, the safe deletions will be performed in a manner that avoids overburdening processing or networking or storage hardware and maintains a minimum level of service to subscribers or users of the service.

In some cases, the increases or decreases in deletions occur after receiving inputs from a user specifying how the deletions are to change. For instance, as shown in FIG. 1, a user 117 may provide input 118 specifying that deletions are to occur more quickly or more slowly or are to be paused for a specified period of time. In some instances, the computer system 101 may provide the user 117 with a user interface that has various switches or dials. The dials may be turned to increase the rate of deletions, decrease the rate of deletions, delay deletions, or perform deletions according to a predefined deletion policy 116. The computer system 101 will then send the corresponding deletion commands 127 according to the inputs from the user 117. The recovery service 604 of FIG. 6 may track the deletions as part of locked safe mutations 605 and other data mutations 606. The recovery service 604 may rate limit the deletion updates that are going into the target cluster 605/606.

The data deletion policy 116 of FIG. 1 may indicate how data deletions are to be modulated within each cluster or data set. In some cases, the data deletion policy will dictate that data deletions are to be slowed or stopped until processing or data storing resources are below a specified maximum threshold level. Once the processing and data storing resources are no longer being used in such a high quantity, the deletion of data will resume. In some cases, the data deletion policy 116 specifies different levels of priority for the data deletions. The levels of priority indicate that, once deletions are to begin according to the data deletion policy 116, the deletions will occur to the highest priority data first (e.g., user-requested removals from the service) and then to lower priority data (e.g., stale data that has surpassed its time to live). Thus, the marked instances of the PII data are deleted according to the level of priority assigned to each data item.

In some cases, the mapping 108 created using the metadata 119 specifies one or more dependencies between different instances of PII data. For instance, if data A depends on data B (or on the state of data B), the instances of PII data may be deleted based on the identified dependencies. This ensures that PII data and associated dependencies are fully deleted. In some cases, the deleting is performed based on user inputs, based on policy, based on dependencies, based on priority level, or based on any combination thereof. The deleting may also be performed differently for different data stores, according to those data stores'storage schemas. In some cases, different data stores may have different rates at which the PII instances are to be deleted. As such, data-store specific deletions may be carried out at deletion rates that are specific to each data store. Still further, at least in some cases, different data stores specify different times to live for PII instances. As such, the PII data for each data store may be deleted according to its own specific TTL. In this manner, data may be safely and securely deleted across a variety of different storage platforms, each having their own specific rules and limits.

In addition to the above-described method, a system may be provided that includes at least one physical processor and physical memory comprising computer-executable instructions that, when executed by the physical processor, cause the physical processor to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

Still further, in addition to the above-described method, a non-transitory computer-readable medium may be provided that includes one or more computer-executable instructions that, when executed by at least one processor of a computing device, cause the computing device to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

Figure 7:
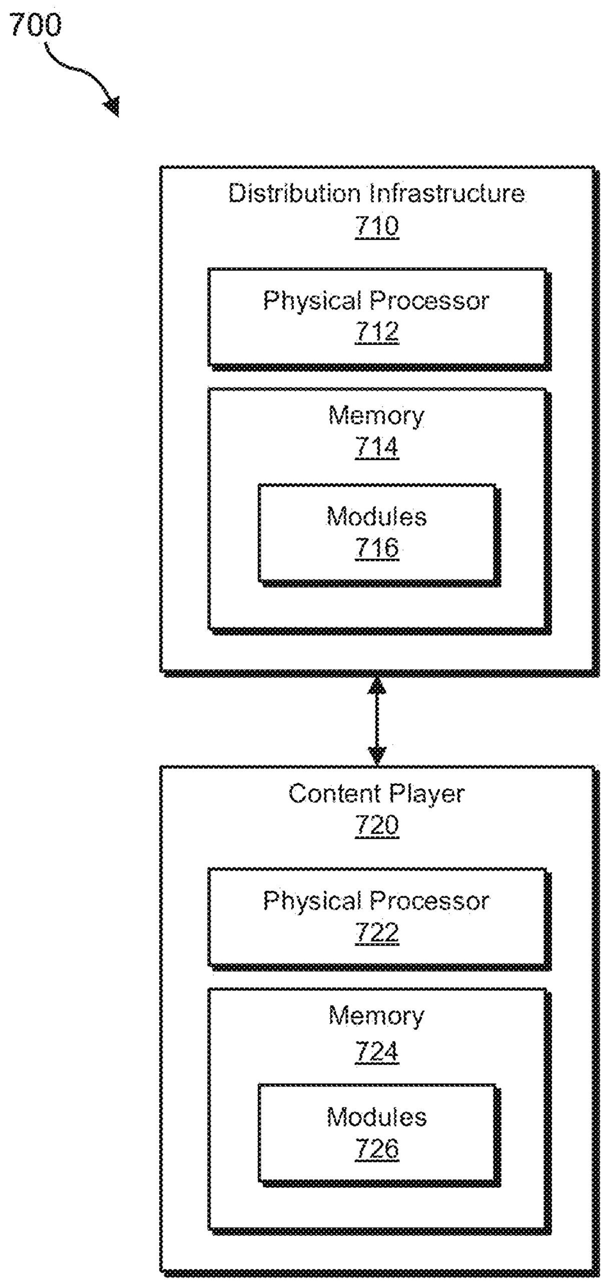
FIG. 7 is a block diagram of an exemplary content distribution ecosystem.
Figure 8:
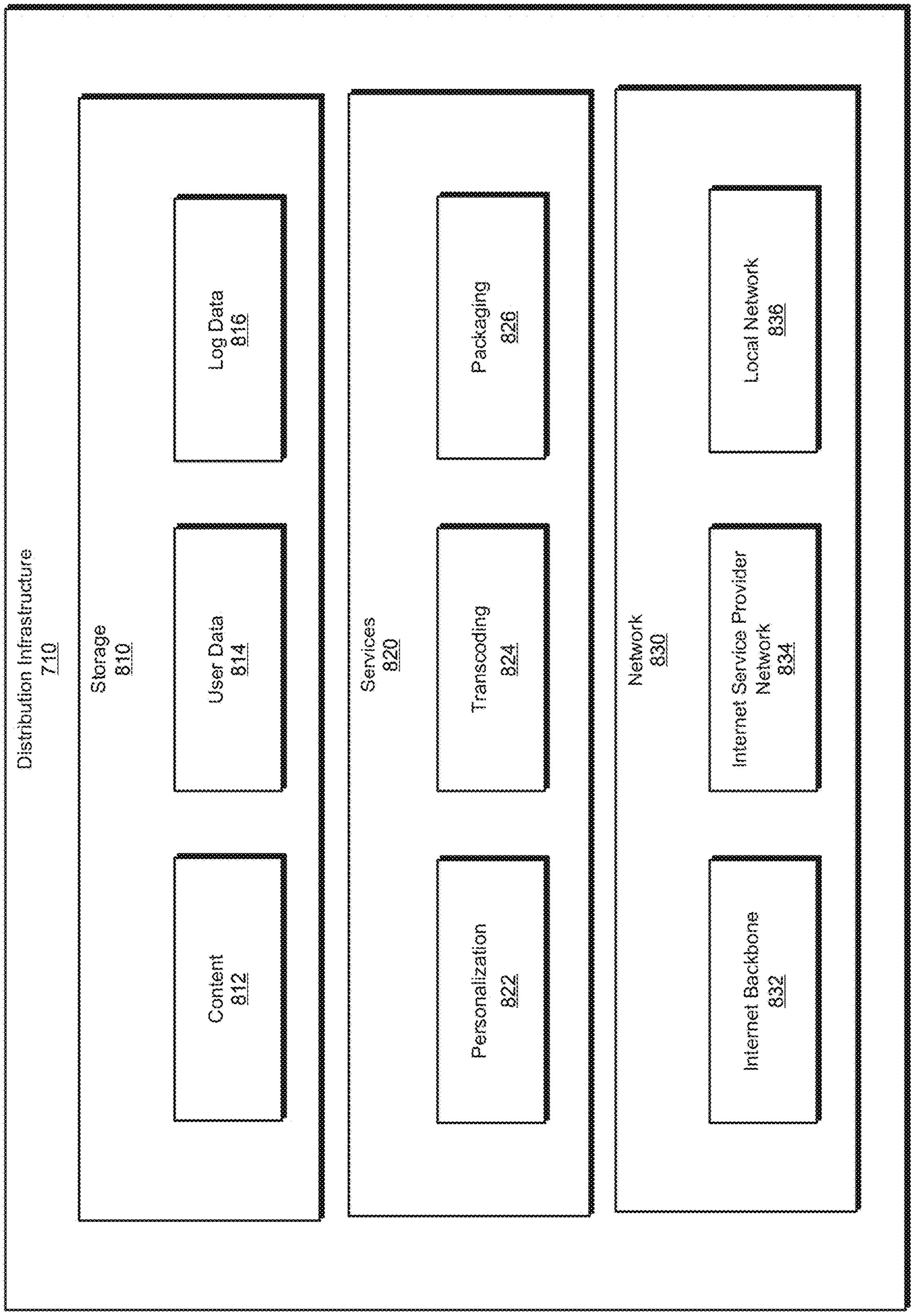
FIG. 8 is a block diagram of an exemplary distribution infrastructure within the content distribution ecosystem shown in FIG. 7.
Figure 9:
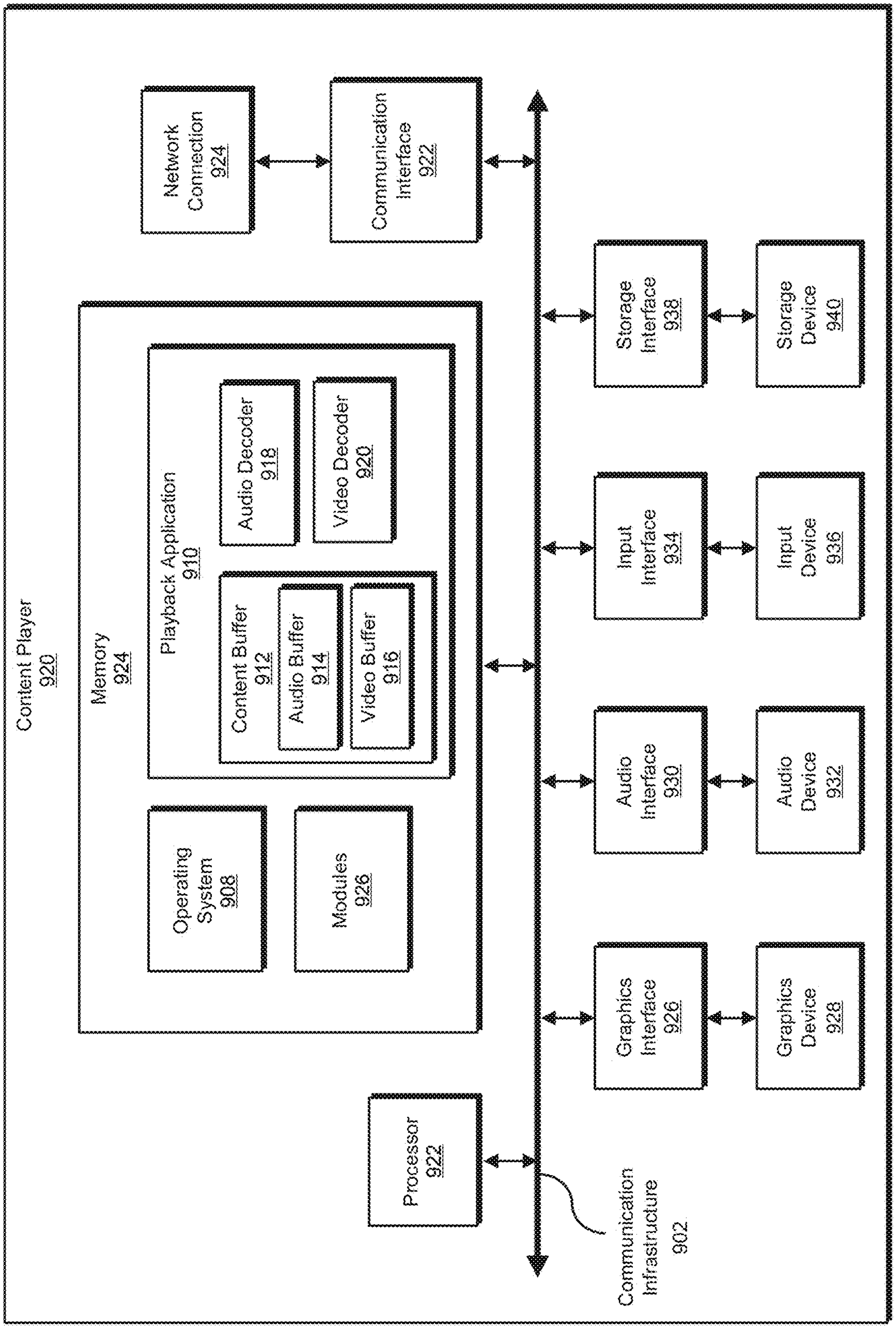
FIG. 9 is a block diagram of an exemplary content player within the content distribution ecosystem shown in FIG. 8.

The following will provide, with reference to FIG. 7, detailed descriptions of exemplary ecosystems in which content is provisioned to end nodes and in which requests for content are steered to specific end nodes. The discussion corresponding to FIGS. 8 and 9 presents an overview of an exemplary distribution infrastructure and an exemplary content player used during playback sessions, respectively. These exemplary ecosystems and distribution infrastructures are implemented in any of the embodiments described above with reference to FIGS. 1-9.

FIG. 7 is a block diagram of a content distribution ecosystem 700 that includes a distribution infrastructure 710 in communication with a content player 720. In some embodiments, distribution infrastructure 710 is configured to encode data at a specific data rate and to transfer the encoded data to content player 720. Content player 720 is configured to receive the encoded data via distribution infrastructure 710 and to decode the data for playback to a user. The data provided by distribution infrastructure 710 includes, for example, audio, video, text, images, animations, interactive content, haptic data, virtual or augmented reality data, location data, gaming data, or any other type of data that is provided via streaming.

Distribution infrastructure 710 generally represents any services, hardware, software, or other infrastructure components configured to deliver content to end users. For example, distribution infrastructure 710 includes content aggregation systems, media transcoding and packaging services, network components, and/or a variety of other types of hardware and software. In some cases, distribution infrastructure 710 is implemented as a highly complex distribution system, a single media server or device, or anything in between. In some examples, regardless of size or complexity, distribution infrastructure 710 includes at least one physical processor 712 and at least one memory 714. One or more modules 716 are stored or loaded into memory 714 to enable adaptive streaming, as discussed herein.

Content player 720 generally represents any type or form of device or system capable of playing audio and/or video content that has been provided over distribution infrastructure 710. Examples of content player 720 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 710, content player 720 includes a physical processor 722, memory 724, and one or more modules 726. Some or all of the adaptive streaming processes described herein is performed or enabled by modules 726, and in some examples, modules 716 of distribution infrastructure 710 coordinate with modules 726 of content player 720 to provide adaptive streaming of digital content.

In certain embodiments, one or more of modules 716 and/or 726 in FIG. 7 represent one or more software applications or programs that, when executed by a computing device, cause the computing device to perform one or more tasks. For example, and as will be described in greater detail below, one or more of modules 716 and 726 represent modules stored and configured to run on one or more general-purpose computing devices. One or more of modules 716 and 726 in FIG. 7 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 712 and 722 generally represent any type or form of hardware-implemented processing unit capable of interpreting and/or executing computer-readable instructions. In one example, physical processors 712 and 722 access and/or modify one or more of modules 716 and 726, respectively. Additionally or alternatively, physical processors 712 and 722 execute one or more of modules 716 and 726 to facilitate adaptive streaming of digital content. Examples of physical processors 712 and 722 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 714 and 724 generally represent any type or form of volatile or non-volatile storage device or medium capable of storing data and/or computer-readable instructions. In one example, memory 714 and/or 724 stores, loads, and/or maintains one or more of modules 716 and 726. Examples of memory 714 and/or 724 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 8 is a block diagram of exemplary components of content distribution infrastructure 710 according to certain embodiments. Distribution infrastructure 710 includes storage 810, services 820, and a network 830. Storage 810 generally represents any device, set of devices, and/or systems capable of storing content for delivery to end users. Storage 810 includes a central repository with devices capable of storing terabytes or petabytes of data and/or includes distributed storage systems (e.g., appliances that mirror or cache content at Internet interconnect locations to provide faster access to the mirrored content within certain regions). Storage 810 is also configured in any other suitable manner.

As shown, storage 810 may store a variety of different items including content 812, user data 814, and/or log data 816. Content 812 includes television shows, movies, video games, user-generated content, and/or any other suitable type or form of content. User data 814 includes personally identifiable information (PII), payment information, preference settings, language and accessibility settings, and/or any other information associated with a particular user or content player. Log data 816 includes viewing history information, network throughput information, and/or any other metrics associated with a user's connection to or interactions with distribution infrastructure 710.

Services 820 includes personalization services 822, transcoding services 824, and/or packaging services 826. Personalization services 822 personalize recommendations, content streams, and/or other aspects of a user's experience with distribution infrastructure 710. Encoding services 824 compress media at different bitrates which, as described in greater detail below, enable real-time switching between different encodings. Packaging services 826 package encoded video before deploying it to a delivery network, such as network 830, for streaming.

Network 830 generally represents any medium or architecture capable of facilitating communication or data transfer. Network 830 facilitates communication or data transfer using wireless and/or wired connections. Examples of network 830 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 8, network 830 includes an Internet backbone 832, an internet service provider 834, and/or a local network 836. As discussed in greater detail below, bandwidth limitations and bottlenecks within one or more of these network segments triggers video and/or audio bit rate adjustments.

FIG. 9 is a block diagram of an exemplary implementation of content player 720 of FIG. 7. Content player 720 generally represents any type or form of computing device capable of reading computer-executable instructions. Content player 720 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 9, in addition to processor 722 and memory 724, content player 720 includes a communication infrastructure 902 and a communication interface 922 coupled to a network connection 924. Content player 720 also includes a graphics interface 926 coupled to a graphics device 928, an input interface 934 coupled to an input device 936, and a storage interface 938 coupled to a storage device 940.

Communication infrastructure 902 generally represents any type or form of infrastructure capable of facilitating communication between one or more components of a computing device. Examples of communication infrastructure 902 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 724 generally represents any type or form of volatile or non-volatile storage device or medium capable of storing data and/or other computer-readable instructions. In some examples, memory 724 stores and/or loads an operating system 908 for execution by processor 722. In one example, operating system 908 includes and/or represents software that manages computer hardware and software resources and/or provides common services to computer programs and/or applications on content player 720.

Operating system 908 performs various system management functions, such as managing hardware components (e.g., graphics interface 926, audio interface 930, input interface 934, and/or storage interface 938). Operating system 908 also provides process and memory management models for playback application 910. The modules of playback application 910 includes, for example, a content buffer 912, an audio decoder 918, and a video decoder 920.

Playback application 910 is configured to retrieve digital content via communication interface 922 and play the digital content through graphics interface 926. Graphics interface 926 is configured to transmit a rendered video signal to graphics device 928. In normal operation, playback application 910 receives a request from a user to play a specific title or specific content. Playback application 910 then identifies one or more encoded video and audio streams associated with the requested title. After playback application 910 has located the encoded streams associated with the requested title, playback application 910 downloads sequence header indices associated with each encoded stream associated with the requested title from distribution infrastructure 710. A sequence header index associated with encoded content includes information related to the encoded sequence of data included in the encoded content.

In one embodiment, playback application 910 begins downloading the content associated with the requested title by downloading sequence data encoded to the lowest audio and/or video playback bitrates to minimize startup time for playback. The requested digital content file is then downloaded into content buffer 912, which is configured to serve as a first-in, first-out queue. In one embodiment, each unit of downloaded data includes a unit of video data or a unit of audio data. As units of video data associated with the requested digital content file are downloaded to the content player 720, the units of video data are pushed into the content buffer 912. Similarly, as units of audio data associated with the requested digital content file are downloaded to the content player 720, the units of audio data are pushed into the content buffer 912. In one embodiment, the units of video data are stored in video buffer 916 within content buffer 912 and the units of audio data are stored in audio buffer 914 of content buffer 912.

A video decoder 920 reads units of video data from video buffer 916 and outputs the units of video data in a sequence of video frames corresponding in duration to the fixed span of playback time. Reading a unit of video data from video buffer 916 effectively de-queues the unit of video data from video buffer 916. The sequence of video frames is then rendered by graphics interface 926 and transmitted to graphics device 928 to be displayed to a user.

An audio decoder 918 reads units of audio data from audio buffer 914 and outputs the units of audio data as a sequence of audio samples, generally synchronized in time with a sequence of decoded video frames. In one embodiment, the sequence of audio samples is transmitted to audio interface 930, which converts the sequence of audio samples into an electrical audio signal. The electrical audio signal is then transmitted to a speaker of audio device 932, which, in response, generates an acoustic output.

In situations where the bandwidth of distribution infrastructure 710 is limited and/or variable, playback application 910 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 926 is configured to generate frames of video data and transmit the frames of video data to graphics device 928. In one embodiment, graphics interface 926 is included as part of an integrated circuit, along with processor 722. Alternatively, graphics interface 926 is configured as a hardware accelerator that is distinct from (i.e., is not integrated within) a chipset that includes processor 722.

Graphics interface 926 generally represents any type or form of device configured to forward images for display on graphics device 928. For example, graphics device 928 is fabricated using liquid crystal display (LCD) technology, cathode-ray technology, and light-emitting diode (LED) display technology (either organic or inorganic). In some embodiments, graphics device 928 also includes a virtual reality display and/or an augmented reality display. Graphics device 928 includes any technically feasible means for generating an image for display. In other words, graphics device 928 generally represents any type or form of device capable of visually displaying information forwarded by graphics interface 926.

As illustrated in FIG. 9, content player 720 also includes at least one input device 936 coupled to communication infrastructure 902 via input interface 934. Input device 936 generally represents any type or form of computing device capable of providing input, either computer or human generated, to content player 720. Examples of input device 936 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 720 also includes a storage device 940 coupled to communication infrastructure 902 via a storage interface 938. Storage device 940 generally represents any type or form of storage device or medium capable of storing data and/or other computer-readable instructions. For example, storage device 940 is a magnetic disk drive, a solid-state drive, an optical disk drive, a flash drive, or the like. Storage interface 938 generally represents any type or form of interface or device for transferring data between storage device 940 and other components of content player 720.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example Embodiments

Example 1: A computer-implemented method comprising: accessing metadata that indicates how various data sets that include a specified type of data are mapped among multiple data stores within a data management platform. The method next includes auditing at least one of the data sets, based on the mapping, to determine where, in the various data stores, instances of the specified type of data are stored. The method then includes taking an offline snapshot of at least a portion of the data stores that include the specified type of data to capture a current state of the instances of the specified type of data that were identified during the auditing. The method further includes searching the offline snapshot for instances of the specified type of data that are marked for deletion, and deleting the marked instances of the specified type of data according to a data deletion policy that governs how the instances of the specified type of data are to be deleted.

Example 2. The computer-implemented method of Example 1, wherein the specified type of data includes personally identifiable information (PII).

Example 3. The computer-implemented method of Example 1 or Example 2, wherein the PII is identified and deleted upon receiving a request from a user to delete their PII.

Example 4. The computer-implemented method of any of Examples 1-3, wherein at least one of the instances of the specified type of data includes data that has been anonymized.

Example 5. The computer-implemented method of any of Examples 1-4, wherein the plurality of data stores within the data management platform includes at least two data stores that store the data sets using different storage schemas.

Example 6. The computer-implemented method of any of Examples 1-5, wherein the offline snapshot includes instances of the specified type of data that include data corresponding to a specified user.

Example 7. The computer-implemented method of any of Examples 1-6, wherein searching the offline snapshot for instances of the specified type of data that are marked for deletion includes searching for instances of the specified type of data that are older than a specified date.

Example 8. The computer-implemented method of any of Examples 1-7, wherein the marked instances of the specified type of data are deleted in a dynamically varied manner that increases or reduces deletions based on one or more factors.

Example 9. The computer-implemented method of any of Examples 1-8, wherein the one or more factors include at least one of CPU utilization or hard drive read/write utilization.

Example 10. The computer-implemented method of any of Examples 1-9, wherein the increases or reductions in deletions occur automatically based on changes in the one or more factors.

Example 11. The computer-implemented method of any of Examples 1-10, wherein the increases or decreases in deletions occur upon receiving inputs from a user specifying how the deletions are to change.

Example 12. The computer-implemented method of any of Examples 1-11, wherein the increases or reductions in deletions occur automatically to avoid degrading the provisioning of live data below a specified threshold level of performance.

Example 13. The computer-implemented method of any of Examples 1-12, wherein the data deletion policy indicates that deletions are to slow or stop until processing or data storing resources are below a specified maximum threshold level.

Example 14. A system comprising at least one physical processor and physical memory comprising computer-executable instructions that, when executed by the physical processor, cause the physical processor to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

Example 15. The system of Example 14, wherein the data deletion policy specifies different levels of priority for the data deletions.

Example 16. The system of Example 14 or Example 15, wherein the marked instances of the specified type of data are deleted according to the specified levels of priority.

Example 17. The system of any of Examples 14-16, wherein the mapping specifies one or more dependencies between instances of the specified type of data, and wherein the instances of the specified type of data are deleted based on the identified dependencies.

Example 18. The system of Examples 14-17, wherein different data stores have different rates at which the instances of the specified type of data are to be deleted.

Example 19. The system of any of Examples 14-18, wherein different data stores specify different times to live for instances of the specified type of data.

Example 20. A non-transitory computer-readable medium comprising one or more computer-executable instructions that, when executed by at least one processor of a computing device, cause the computing device to: access metadata that indicates how various data sets that include a specified type of data are mapped among multiple data stores within a data management platform, audit at least one of the data sets, based on the mapping, to determine where, in the various data stores, instances of the specified type of data are stored, take an offline snapshot of at least a portion of the data stores that include the specified type of data to capture a current state of the instances of the specified type of data that were identified during the auditing, search the offline snapshot for instances of the specified type of data that are marked for deletion, and delete the marked instances of the specified type of data according to a data deletion policy that governs how the instances of the specified type of data are to be deleted.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

accessing metadata that indicates how one or more data sets, that include a specified type of data, are mapped among a plurality of data stores within a data management platform;

auditing the one or more data sets, based on at least the mapping, to determine where, in the plurality of data stores, instances of the specified type of data are stored;

taking an offline snapshot of at least a portion of the plurality of data stores that include the specified type of data, the offline snapshot comprising a current state of the instances of the specified type of data that were identified during the auditing;

searching the offline snapshot for instances of the specified type of data that are marked for deletion based on at least a request for removal and the specified type of data being older than a specified date; and deleting the marked instances of the specified type of data, wherein the deletion of the marked instances is to be paused or slowed responsive to a capacity of processing resources or storage resources being above a threshold level.

2. The computer-implemented method of claim 1, wherein the specified type of data includes personally identifiable information (PII).

3. The computer-implemented method of claim 2, wherein the PII is identified and deleted upon receiving a request from a user to delete their PII.

4. The computer-implemented method of claim 1, wherein at least one of the instances of the specified type of data includes data that has been anonymized.

5. The computer-implemented method of claim 1, wherein the plurality of data stores within the data management platform includes at least two data stores that store the data sets using different storage schemas.

6. The computer-implemented method of claim 1, wherein the offline snapshot includes instances of the specified type of data that include data corresponding to a specified user.

7. The computer-implemented method of claim 1, wherein the marked instances of the specified type of data are deleted in a dynamically varied manner that increases or reduces deletions based on one or more factors.

8. The computer-implemented method of claim 7, wherein the one or more factors include at least one of CPU utilization or hard drive read/write utilization.

9. The computer-implemented method of claim 7, wherein the increases or reductions in deletions occur automatically based on changes in the one or more factors.

10. The computer-implemented method of claim 7, wherein the increases or decreases in deletions occur upon receiving inputs from a user specifying how the deletions are to change.

11. The computer-implemented method of claim 7, wherein the increases or reductions in deletions occur automatically to avoid degrading a provisioning of live data below a specified threshold level of performance.

12. The computer-implemented method of claim 1, wherein a data deletion policy indicates that deletions are to slow or stop until processing resources or data storing resources are below a specified maximum threshold level.

13. A system comprising:

at least one physical processor; and physical memory comprising computer-executable instructions that, when executed by the physical processor, cause the physical processor to:

access metadata that indicates how one or more data sets that include a specified type of data are mapped among a plurality of data stores within a data management platform;

audit the one or more data sets, based on at least the mapping, to determine where, in the plurality of data stores, instances of the specified type of data are stored;

take an offline snapshot of at least a portion of the plurality of data stores that include the specified type of data, the offline snapshot comprising a current state of the instances of the specified type of data that were identified during the auditing;

search the offline snapshot for instances of the specified type of data that are marked for deletion based on at least a request for removal and the specified type of data being older than a specified date; and delete the marked instances of the specified type of data, wherein the deletion of the marked instances is to be paused or slowed responsive to a capacity of processing resources or storage resources being above a threshold level.

14. The system of claim 13, wherein a data deletion policy specifies different levels of priority for the data deletions.

15. The system of claim 14, wherein the marked instances of the specified type of data are deleted according to the specified levels of priority.

16. The system of claim 13, wherein the mapping specifies one or more dependencies between instances of the specified type of data, and wherein the instances of the specified type of data are deleted based on the one or more dependencies.

17. The system of claim 13, wherein different data stores have different rates at which the instances of the specified type of data are to be deleted.

18. A non-transitory computer-readable medium comprising one or more computer-executable instructions that, when executed by at least one processor of a computing device, cause the computing device to:

access metadata that indicates how one or more data sets that include a specified type of data are mapped among a plurality of data stores within a data management platform;

audit the one or more data sets, based on at least the mapping, to determine where, in the plurality of data stores, instances of the specified type of data are stored;

take an offline snapshot of at least a portion of the plurality of data stores that include the specified type of data, the offline snapshot comprising a current state of the instances of the specified type of data that were identified during the auditing;

search the offline snapshot for instances of the specified type of data that are marked for deletion based on at least a request for removal and the specified type of data being older than a specified date; and delete the marked instances of the specified type of data, wherein the deletion of the marked instances is to be paused or slowed responsive to a capacity of processing resources or storage resources being above a threshold level.

* * * * *